(12) United States Patent
Abuelsaad et al.

(10) Patent No.: US 9,208,013 B2
(45) Date of Patent: Dec. 8, 2015

(54) CROSS COMMUNICATION OF COMMON PROBLEM DETERMINATION AND RESOLUTION

(71) Applicant: International Business Machines Corporation, Armonk, NY (US)

(72) Inventors: Tamer E. Abuelsaad, Poughkeepsie, NY (US); Gregory J. Boss, Saginaw, MI (US); Clifford A. Pickover, Yorktown Heights, NY (US); Randy A. Rendahl, Raleigh, NC (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 215 days.

(21) Appl. No.: 13/746,463

(22) Filed: Jan. 22, 2013

(65) Prior Publication Data

US 2014/0208150 A1    Jul. 24, 2014

(51) Int. Cl.
*G06F 11/00*    (2006.01)
*G06F 11/07*    (2006.01)

(52) U.S. Cl.
CPC ........ *G06F 11/0781* (2013.01); *G06F 11/0709* (2013.01)

(58) Field of Classification Search
CPC .......... G06F 11/0766–11/0793; G06F 11/0709
See application file for complete search history.

(56) References Cited

U.S. PATENT DOCUMENTS

| | | | |
|---|---|---|---|
| 7,516,367 B1 | 4/2009 | Beltowski et al. | |
| 7,552,361 B2 | 6/2009 | Galler et al. | |
| 7,735,078 B1 | 6/2010 | Vaidya | |
| 7,949,906 B2 * | 5/2011 | Ikegami | 714/57 |
| 7,979,747 B2 | 7/2011 | Bhatnagar et al. | |
| 8,156,388 B2 | 4/2012 | Herrod | |
| 8,181,173 B2 | 5/2012 | Childress et al. | |
| 2006/0277442 A1 * | 12/2006 | Lantz et al. | 714/38 |
| 2009/0064123 A1 * | 3/2009 | Ramesh et al. | 717/168 |
| 2009/0158099 A1 * | 6/2009 | Cui | 714/57 |
| 2009/0210745 A1 | 8/2009 | Becker et al. | |
| 2009/0249288 A1 | 10/2009 | Jin et al. | |
| 2010/0062835 A1 * | 3/2010 | Hopkins | 463/25 |
| 2011/0107137 A1 * | 5/2011 | Lam et al. | 714/4.4 |
| 2011/0113413 A1 | 5/2011 | Ewington et al. | |
| 2011/0113416 A1 | 5/2011 | McCurdy et al. | |
| 2011/0113418 A1 | 5/2011 | McCurdy et al. | |
| 2011/0113424 A1 | 5/2011 | Ewington et al. | |

* cited by examiner

*Primary Examiner* — Joseph Kudirka
*Assistant Examiner* — Jason Bryan
(74) *Attorney, Agent, or Firm* — Maxine L. Barasch; Keohane & D'Alessandro PLLC (57) ABSTRACT

Approaches for problem determination and resolution process cross communication are provided. Embodiments provide cross communication of a problem determination and resolution among similar data center devices. Specifically, symptoms of an error condition encountered for one data center device are captured by a first enterprise group, along with an associated resolution solution, and made available to an another enterprise group managing a commonly configured data center device, which may be faced with a similar error condition. The error signature and resolution steps captured by the first enterprise group are subsequently made available within and across multiple management domains operating within a common model (e.g., a publication-subscription system). Within this model, both the originator of the error determination and resolution (i.e., publisher), and one or more commonly configured data center devices susceptible to the same error condition (i.e., subscribers), can filter, access, and control the flow of error resolutions.

20 Claims, 3 Drawing Sheets

CROSS COMMUNICATION OF COMMON PROBLEM DETERMINATION AND RESOLUTION

FIELD OF THE INVENTION

This invention relates generally to problem identification and resolution dissemination, and more specifically, to cross communication of common problem determination and resolution among similar data center devices.

BACKGROUND OF THE INVENTION

A data center is made up of a plurality of computer server devices of different types and operating systems. Servers may be used for a variety of purposes, or simply to backup or mirror one another (load balancing, backup, etc.). Servers enclosed in one data center may be under the management of different independent groups, and are isolated by responsibility boundaries. The independent groups might be IT management teams of different tenants of the data center, each management team responsible for IT management beyond that which is provided by the common team representing the data center provider. Similarly, within an enterprise that maintains common base technology and standards, there are often various disparate groups that have management responsibilities for islands of the overall enterprise IT environment. Within this environment, if two servers are experiencing the same problem, there will be many cases where different organizations are responsible for the investigation and resolution. In most cases, these organizations are not in communication or cooperation with each other because they are each responsible for different subsets of resources residing in the same data center (or corporate standard) environment, but could greatly benefit from the results obtained in resolving the same issue by another organization.

There are a number of current solutions that perform patch management. However, these solutions fail to selectively disseminate patch solutions to other servers that are in some way linked together (e.g., by business relationship, or by being in the same data center). Accordingly, what is needed is a solution that solves at least one of the above-identified deficiencies.

SUMMARY OF THE INVENTION

In general, embodiments of the invention provide cross communication of a problem determination and resolution among similar data center devices. Specifically, symptoms of an error condition encountered for one data center device are captured by a first enterprise group, along with an associated resolution solution, and made available to an another enterprise group managing a commonly configured data center device, which may be faced with a similar error condition. The error signature and resolution steps captured by the first enterprise group are subsequently made available within and across multiple management domains operating within a common model (e.g., a publication-subscription system). Within this model, both the originator of the error determination and resolution (i.e., publisher), and one or more commonly configured data center devices susceptible to the same error condition (i.e., subscribers), can filter, access, and control the flow of error resolutions. By capturing and sharing this information across data center devices grouped by configuration commonality, performance and efficiency are improved.

In one embodiment, there is a method for problem determination and resolution process cross communication. In this embodiment, the method comprises the computer implemented steps of: detecting symptoms of an error condition for a first data center device, the first data center device managed by a first enterprise group in a first management domain; analyzing a resolution process performed by the first enterprise group for addressing the error condition for the first data center device; and publishing the error condition and the resolution process for access by a second enterprise group that manages a second data center device in a second management domain, wherein the error condition relates to a set of common configurations shared by the first data center device and the second data center device across the first and second management domains.

In a second embodiment, there is a system for problem determination and resolution process cross communication. In this embodiment, the system comprises at least one processing unit, and memory operably associated with the at least one processing unit. A solution publishing system (SPS) is storable in memory and executable by the at least one processing unit. The SPS comprises an error detection component configured to detect symptoms of an error condition for a first data center device, the first data center device managed by a first enterprise group in a first management domain; a resolution component configured to analyze a resolution process performed by the first enterprise group for addressing the error condition for the first data center device; and a publication and subscription component configured to publish the error condition and the resolution process for access by a second enterprise group that manages a second data center device in a second management domain, wherein the error condition relates to a set of common configurations shared by the first data center device and the second data center device across the first and second management domains.

In a third embodiment, there is a computer-readable storage medium storing computer instructions, which when executed, enables a computer system to provide problem determination and resolution process cross communication. In this embodiment, the computer instructions comprise: detecting symptoms of an error condition for a first data center device, the first data center device managed by a first enterprise group in a first management domain; analyzing a resolution process performed by the first enterprise group for addressing the error condition for the first data center device; and publishing the error condition and the resolution process for access by a second enterprise group that manages a second data center device in a second management domain, wherein the error condition relates to a set of common configurations shared by the first data center device and the second data center device across the first and second management domains.

In a fourth embodiment, there is a method for deploying a solution publishing system for use in a computer system that provides problem determination and resolution process cross communication. In this embodiment, a computer infrastructure is provided and is operable to: detect symptoms of an error condition for a first data center device, the first data center device managed by a first enterprise group in a first management domain; analyze a resolution process performed by the first enterprise group for addressing the error condition for the first data center device; and publish the error condition and the resolution process for access by a second enterprise group that manages a second data center device in a second management domain, wherein the error condition relates to a set of common configurations shared by the first data center device and the second data center device across the first and second management domains.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

The invention will now be described more fully herein with reference to the accompanying drawings, in which exemplary embodiments are shown. Embodiments described herein provide cross communication of a problem determination and resolution among similar data center devices. Specifically, symptoms of an error condition encountered for one data center device are captured by a first enterprise group, along with an associated resolution solution, and made available to an another enterprise group managing a commonly configured data center device, which may be faced with a similar error condition. The error signature and resolution steps captured by the first enterprise group are subsequently made available within and across multiple management domains operating within a common model (e.g., a publication-subscription system). Within this model, both the originator of the error determination and resolution (i.e., publisher), and one or more commonly configured data center devices susceptible to the same error condition (i.e., subscribers), can filter, access, and control the flow of error resolutions. By capturing and sharing this information across data center devices grouped by configuration commonality, performance and efficiency are improved.

This disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "computing," "determining," "evaluating," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

Figure 1:
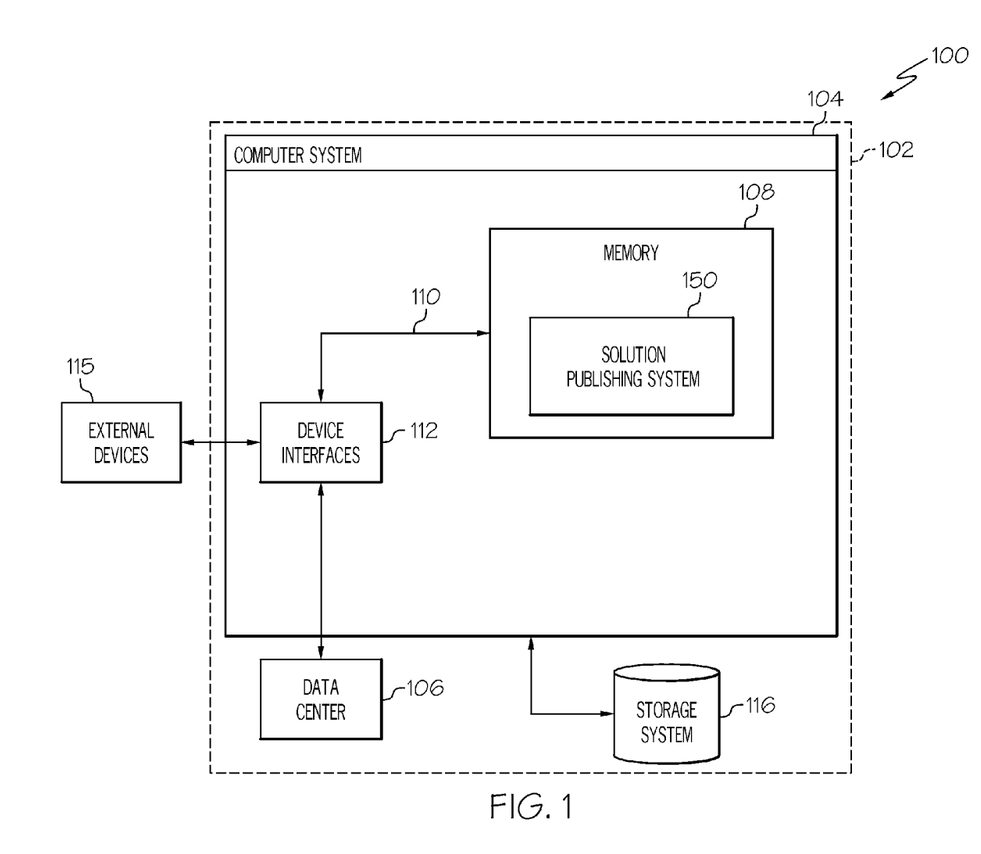
FIG. 1 shows a schematic of an exemplary computing environment in which elements of the present invention may operate.

Referring now to FIG. 1, a computerized implementation 100 of the present invention will be described in greater detail. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), a cloud-computing environment, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for cross communication of a problem determination and resolution among similar data center devices. It should be understood that any other computers implemented under the present invention may have different components/software, but will perform similar functions. As shown, computer system 104 includes a processing unit 106 capable of communicating with a data center 106. Also, shown is memory 108 for storing a solution publishing system (SPS) 150, a bus 110, and device interfaces 112.

Processing unit 106 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 106 collects and routes signals representing outputs from external devices 115 (e.g., a graphical user interface operated by an end-user) to SPS 150. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different sensor systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating SPS 150, which is stored in memory 108 and/or storage system 116. While executing computer program code, processing unit 106 can read and/or write data to/from memory 108, storage system 116, and data center 106. Storage system 116 can include VCRs, DVRs, RAID arrays, USB hard drives, optical disk recorders, flash storage devices, and/or any other data processing and storage elements for storing and/or processing data. Although not shown, computer system 104 could also include I/O interfaces that communicate with one or more external devices 115 that enable a user to interact with computer system 104 (e.g., a keyboard, a pointing device, a display, etc.).

Figure 2:
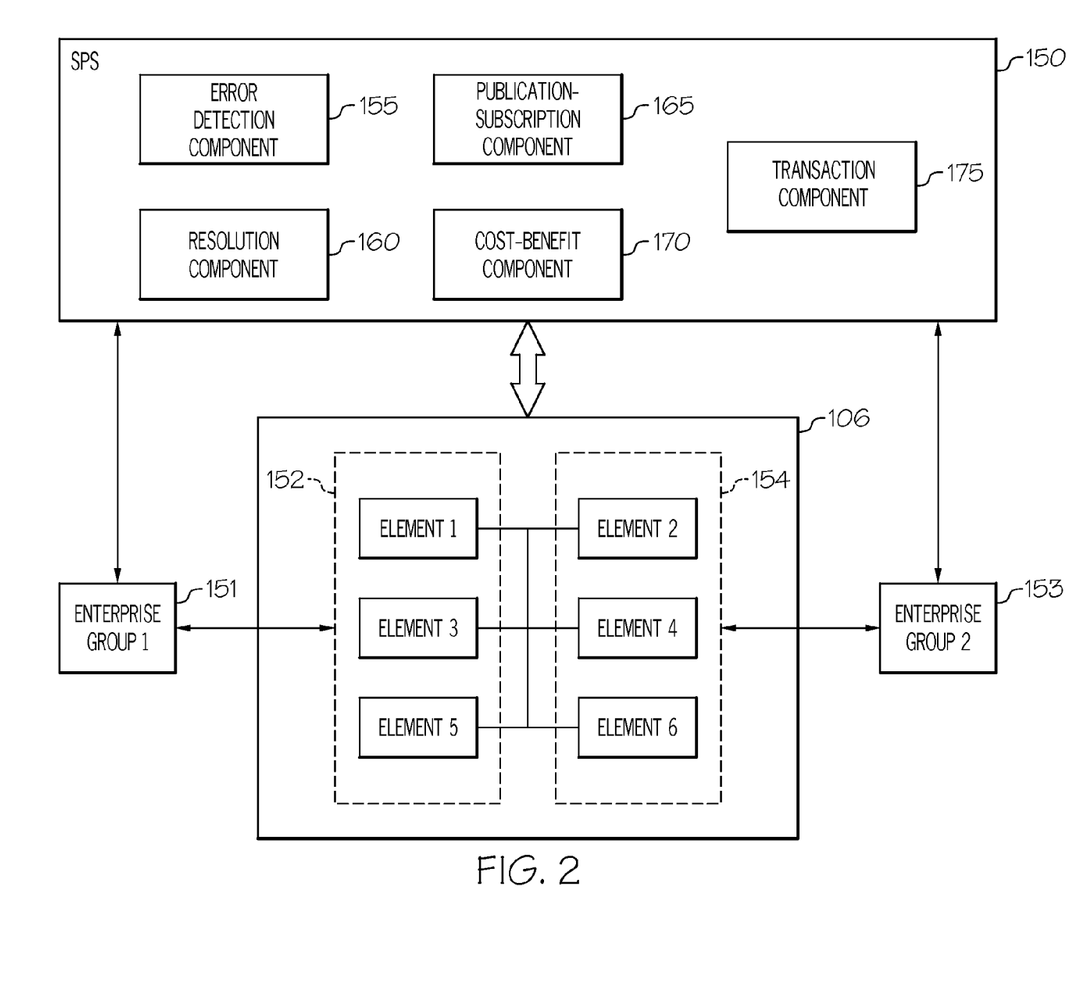
FIG. 2 shows a more detailed view of an SPS that operates in the environment shown in FIG. 1.

Referring now to FIG. 2, SPS 150 and data center 106 will be described in greater detail. In an exemplary embodiment, SPS 150 operates with data center 106 to provide problem determination and resolution process cross-communication. SPS 150 allows the controlled fan-out of fixes across datacenter 106 (or enterprise) between data center devices (i.e., elements 1-6) owned or managed by different organizations. As shown for purposes of demonstration, data center 106 comprises six (6) elements (e.g., servers) arranged by enterprise group, which may be isolated by responsibility boundaries of a management domain. For example, elements 1,3 and 5 are managed by a first enterprise group 151 in a first management domain 152, while elements 2, 4, and 6 are managed by a second enterprise group 153 in a second management domain 154. First and second enterprise groups 151, 153 may be IT management teams of different tenants of data center 106 responsible for IT management of one or more elements beyond that which is commonly provided by a team representing the data center provider. In another embodiment, e.g., within an enterprise that maintains common base technology and standards, first and second enterprise groups 151, 153 may represent various disparate groups that have management responsibilities for islands of the overall enterprise IT environment.

In this configuration, if two similar elements (e.g., computer server devices) are experiencing or exhibiting the same problem, there is a high probability that the solution to one element can be applied to the other. SPS 150 analyzes and captures the solution to the detected problem/error and automatically makes that solution available to other enterprise groups managing servers of similar design and configuration based on a publish and subscribe based design. SPS 150 allows the separate enterprise groups 151 and 153 to leverage the solutions that relate to the common characteristics across the first and second management domains 152, 154 of datacenter 106, while retaining separate management spaces. SPS 150 further allows the controlled fan-out of solutions across datacenter 106 (or enterprise) across organizational responsibility boundaries of each management domain. The use of a publication-subscription model for the cross group sharing of problem signatures and related solution steps within a technologically similar community improves overall performance and efficiency.

To accomplish this, SPS 150 comprises an error detection component 155, as shown in FIG. 2. Error detection component 155 is configured to detect symptoms of an error condition for a first data center device, e.g., element 1 of data center 106. Error detection component 155 may perform a sweep search of each data center device. Alternatively, error detection component can receive notification from any element indicating the presence of an issue/error. This allows SPS 150 to respond only to elements that elicit help. The "symptoms" of an error condition may include virtually any indicator that alerts an enterprise group to the presence of, for example, hardware errors, software errors, inefficiency associated with non-optimal use of software and hardware, the presence of malware, an inappropriate security setting, back-level software, etc.

Once the error condition is detected, a resolution component 160 analyzes one or more resolution processes performed by first enterprise group 151 for correcting the error condition for the first data center device. For example, resolution component 160 monitors element 1 and records all actions taken against the detected error condition until a solution is found. Resolution component 160 logs the design and configuration of element 1 (e.g., hardware, firmware and OS levels, software installed, network and disk configurations, heap storage, etc.), which may also be common to elements 2-6.

Furthermore, a subset of analyzed activity by resolution component 160 may represent debugging and failed attempts that need to be pruned from the solution to provide an optimized correction. In this case, the debugging, failed attempts, etc., are retained as background for solution consumers, e.g., elements 2-6. Validation is performed through reversing the pruned steps to recreate the problem and validate the steps to correct it. In one embodiment, a human operator may prune the debugged and failed options from the solution.

Next, the solved error condition and its associated resolution process(es) are sent to a publication-subscription component 165 of SPS 150. In exemplary embodiments, publication-subscription component 165 is configured to publish the error condition and the resolution process for access by second enterprise group 153 managing a second data center device (e.g., elements 2-6) on a subscription basis. The second data center device shares a set of common configurations (e.g., hardware, firmware and OS levels, software installed, network and disk configurations, heap storage, etc.) with the first data center device (e.g., element 1), such that application of the resolution process will offer a potential benefit to the second data center device.

During operation, publication-subscription component 165 is further configured to search for and locate one or more data center devices sharing common characteristics. In one embodiment, commonality of configurations may be determined through an automatic query of configuration databases, which contain information on software, hardware, operating systems, security settings, software-levels, history of problems, etc. In another embodiment, this is based on at least one of: a profile associated with the second data center device, and a scan of a set of applications associated with the second data center device. Specifically, publication-subscription component 165 inspects the publishing policy to determine if the corrective actions fit patterns/rules for publication, and analyzes subscription rules to determine if other data center devices (e.g., elements 2-6) have expressed interest in the define problem signature or solution pattern. The publish-subscribe profiles of each data center device may be based on simple pattern matching filters according to the problem description or solution steps looking to include or exclude certain patterns. A more formal model may be based on formal attributes that identify types of errors, problem source(s), environment settings, etc. The searching may be through various modalities including wireless or wired networks, and the searching may be done in a peer-to-peer fashion. The searching may also be constrained by location. For example, the search may start in one server room and then "fan-out" to other rooms.

Furthermore, the searching of other elements may be done in an opt-in fashion (e.g. by permission of owners or enterprise group) so that the searching may be done across companies, enterprises, management domains, datacenters, etc. Element owners may opt-in for such a service and provide a user profile to suggest the kinds of fixes, suggestions, help, patches, etc., that may be most interested in. Alternatively, SPS 150 may scan the number and nature of applications on a system to infer the kinds of fixes, suggestions, help, patches, etc., that they may be most beneficial. In the case that server farms offer this service to customers, the customers may be more likely to want to use such server farms than other server farms without this feature.

SPS 150 may thus offer this searching and fixing as a service. SPS 150 comprises a transaction component 175 configured to charge a fee for the searching and fixing within data center 106. Users of this service benefit because they can gain value (e.g. a better-functioning system) through the monitoring of systems of other companies. The SPS 150 provider benefits because it offers a service users want, while maintaining security and privacy.

Next, publication-subscription component 165 is configured to apply the resolution process to the second data center device. That is, the specific element(s) (e.g., server) of the subscriber organizations are identified as having the same error condition and similar design/configuration, and the resolution process is implemented, regardless of the location of the element within a given management domain.

In another embodiment, SPS 150 may take into account financial budgets using an automated cost-benefit evaluation. Specifically, cost-benefit component 170 is configured to determine whether to apply the resolution process to the second data center device based on a comparison of budget to at least one of: a benefit value of applying the resolution process to the second data center device, a cost of analyzing the resolution process, and a cost of applying the resolution process to the second data center device. For example, an element owner/operator may have the option of excluding certain actions from consideration if they are deemed to be inappropriate to monitor or apply. Cost-benefit component 170 provides the option of excluding certain actions from consideration if they are deemed to be inappropriate to monitor or apply. In one embodiment, an "inappropriate" action is one that is provides a minimal return on investment. That is, if a solution provides a very minor correction or feature yet is very expensive to apply, it may be considered inappropriate when automatically compared to a financial budget, which may be low at certain times of the year. Thus, the following cost-benefit steps are performed:

1. Cost-benefit component 170 determines cost (C) of determining and applying a fix for the error;
2. Cost-benefit component 170 determines importance (I) of making a fix;
3. Cost-benefit component 170 determines current and forecast use of a financial budget; and
4. Cost-benefit component 170 determines if $f(C,I)<$budget. If yes, then make fix, otherwise defer fix.

Consider now the following non-limiting example. In this case, a data center provider adds a backup domain name system (DNS) server within the data center. At a later point, the primary DNS server is taken off-line for maintenance. Due to poor communication or process failures, a number of customers have not updated the network configurations to use the load balancer and have been going directly to the primary DNS server. In each environment, this quickly results in critical failures. Although multiple enterprise groups may each begin investigating, as the first group (e.g., IT personnel) identifies the problem and provides the appropriate correction, SPS 150 captures the corrective steps and shares them within and across organizations (e.g., enterprise groups 151 and 153) and management domains. The other data center clients have access to the new solution and may opt to apply it to any elements under management using a change process, e.g., as part of an automated evaluation and application within a client specific policy. The first group (i.e., publisher) may have set policies that indicate any data center network change update related fixes may be published. The other data center clients (i.e., subscribers) may have open interest in all updates or network setting related filters to watch for those updates.

As described herein, the present invention allows the controlled fan-out of fixes across a datacenter or enterprise between machines owned or managed by different organizations in different management domains. SPS 150 consists of a subscription-based participation model, policy-based interest profiles, and distribution of problem signature/resolution pairs. SPS 150 fingerprints identified issues, using common techniques used for generating signatures, identifies fixes performed on the first-fixed data center device, compares issues detected by monitoring tools on other data center devices, and recommends fixes to other data center device owners.

It can be appreciated that the approaches disclosed herein can be used within a computer system for problem determination and resolution process cross communication, as shown in FIG. 1. In this case, SPS 150 can be provided, and one or more systems for performing the processes described in the invention can be obtained and deployed to computer infrastructure 102. To this extent, the deployment can comprise one or more of: (1) installing program code on a data center device, such as a computer system, from a computer-readable storage medium; (2) adding one or more data center devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 3:
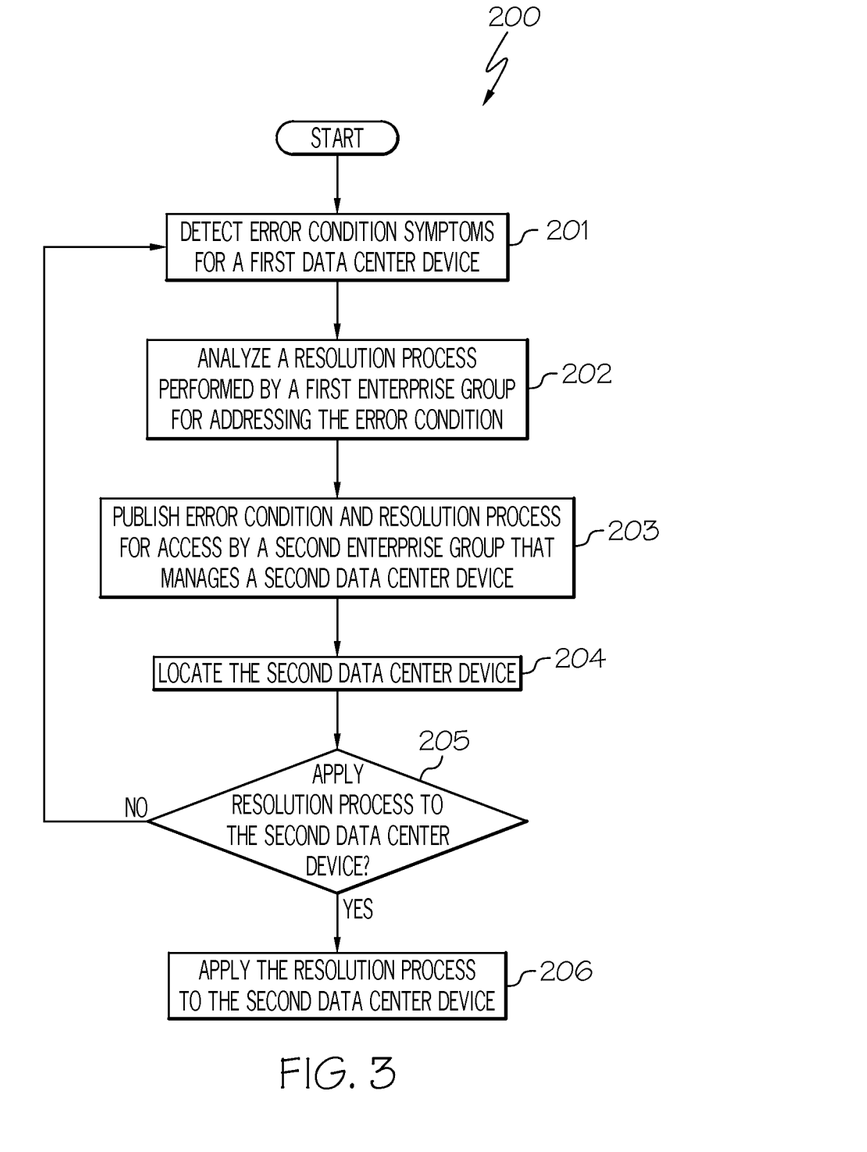
FIG. 3 shows a flow diagram for problem determination and resolution process cross communication according to embodiments of the invention.

The program modules carry out the methodologies disclosed herein, as shown in FIG. 3. Shown is a method 200 for problem determination and resolution process cross communication, wherein, at 201, symptoms of an error condition for a first data center device (e.g., server element) are detected. At 202, a resolution process for addressing the error condition by a first enterprise group for the first data center device is analyzed. At 203, the error condition and the resolution process are published for access by a second enterprise group managing a second data center device, wherein the error condition relates to a set of common configurations shared by the first data center device and the second data center device across first and second management domains. At 204, the second data center device is located. At 205, it is determined whether to apply the resolution process to the second data center device. If NO, return to 201. If yes, the resolution process is applied to second data center device at 206.

The flowchart of FIG. 3 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, as will be described herein, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

For example, an implementation of exemplary computer system 104 (FIG. 1) may be stored on or transmitted across some form of computer readable media. Computer readable media can be any available media that can be accessed by a computer. By way of example, and not limitation, computer readable media may comprise "computer storage media" and "communications media."

"Computer-readable storage device" includes volatile and non-volatile, removable and non-removable computer storable media implemented in any method or technology for storage of information such as computer readable instructions, data structures, program modules, or other data. Computer storage device includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided an approach for problem determination and resolution process cross communication. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for problem determination and resolution process cross communication, the method comprising the computer-implemented steps of:
    performing a sweep search of each data center device of a plurality of data center devices physically enclosed in a data center for at least one indicator of an error condition, the error condition comprising at least one of a software error, an inefficiency associated with non-optimal use of software and hardware, a presence of malware, an inappropriate security setting, or a back-level software;
    detecting symptoms of the error condition for a first data center device, the first data center device belonging to a first group of servers, the first data center device managed by a first enterprise group in a first management domain within a data center;
    performing a resolution process until a solution is found;
    analyzing the resolution process performed by the first enterprise group for addressing the error condition for the first data center device;
    recording all actions taken in the resolution process against the error condition;
    logging a design and configuration of the first data center device;
    removing from the resolution process any debugging and failed attempts;
    recording the any debugging and failed attempts as background for later use;
    determining, based on a type of error, a problem source, an environment setting, and design and configuration of a second data center device in a second management domain within the data center, whether the error condition and the resolution process should be published to at least one of the set of subscribers; and
    publishing, based on the determination, the error condition and the resolution process for access by the at least one of the set of subscribers, the at least one of the set of subscribers comprising a second enterprise group that manages the second data center device in the second management domain within the data center, wherein the error condition relates to a set of common configurations shared by the first data center device and the second data center device; and
    determining whether to apply the resolution process to the second data center device by:
    determining a cost for determining and applying a fix for an error at the second data center device;
    determining an importance of applying the fix; determining a current and a forecast use of a financial budget for the second data center device; and
    comparing the cost for determining and applying the fix in relation to the importance of the fix to the financial budget to determine whether to apply the resolution process to the second data center device;
    wherein the first data center device comprises a first server in a client-server environment, and the second data center device comprises a second server in the client-server environment.

2. The method according to claim 1, further comprising the computer-implemented step of applying the resolution process to the second data center device.

3. The method according to claim 1, further comprising the computer-implemented step of determining whether to apply the resolution process to the second data center device based on a comparison of a budget to at least one of: a cost of analyzing the resolution process, and a cost of applying the resolution process to the second data center device.

4. The method according to claim 3, further comprising the computer-implemented steps of:
    determining a benefit value of applying the resolution process to the second data center device; and
    determining whether to apply the resolution process to the second data center device based on the benefit value and the comparison of the budget to at least one of: the cost of analyzing the resolution process, and the cost of applying the resolution process to the second data center device.

5. The method according to claim 1, further comprising the computer-implemented steps of providing the error condition and the resolution process to the second enterprise group on a subscription basis.

6. The method according to claim 1, further comprising locating the second data center device based on at least one of: a profile associated with the second data center device, and a scan of a set of applications associated with the second data center device.

7. A computer system for problem determination and resolution process cross communication, the system comprising:
    at least one processing unit;
    memory operably associated with the at least one processing unit; and
    a solution publishing system (SPS) storable in memory and executable by the at least one processing unit, the SPS comprising:
        an error detection component configured to;
            perform a sweep search of each data center device of a plurality of data center devices physically enclosed in a data center for at least one indicator of an error condition, the error condition comprising at least one of a software error, an inefficiency associated with non-optimal use of software and hardware, a presence of malware, an inappropriate security setting, or a back-level software;
            determine symptoms of the error condition for a first data center device, the first data center device belonging to a first group of servers, the first data center device managed by a first enterprise group in a first management domain within a data center;
        a resolution component configured to:
            perform a resolution process until a solution is found;
            analyze the resolution process performed by the first enterprise group for addressing the error condition for the first data center device;
            record all actions taken in the resolution process against the error condition;
            log a design and configuration of the first data center device;
            remove from the resolution process any debugging and failed attempts;
            record the any debugging and failed attempts as background for later use;

a publication and subscription component configured to determine, type of error, a problem source, an environment setting, and design and configuration of a second data center device in a second management domain within the data center, whether the error condition and the resolution process should be published to the at least one of the set of subscribers, the publication and subscription component further configured to publish, based on the determination, the error condition and the resolution process for access by the at least one of the set of subscribers, the at least one of the set of subscribers comprising the second management domain within the data center, wherein the error condition relates to a set of common configurations shared by the first data center device and the second data center device across the first and second management domains, wherein the publication and subscription component are further configured to determine whether to apply the resolution process to the second data center device by:
  determining a cost for determining and applying a fix for an error at the second data center device;
  determining an importance of applying the fix;
  determining a current and a forecast use of a financial budget for the second data center device; and
  comparing the cost for determining and applying the fix in relation to the importance of the fix to the financial budget to determine whether to apply the resolution process to the second data center device;
wherein the first data center device comprises a first server in a client-server environment, and the second data center device comprises a second server in the client-server environment.

8. The computer system according to claim 7, the publishing and subscription component further configured to apply the resolution process to the second data center device.

9. The computer system according to claim 7, further comprising a cost-benefit component configured to determine whether to apply the resolution process to the second data center device based on a comparison of a budget to at least one of: a cost of analyzing the resolution process, and a cost of applying the resolution process to the second data center device.

10. The computer system according to claim 9, the cost-benefit component further configured to:
  determine a benefit value of applying the resolution process to the second data center device; and
  determine whether to apply the resolution process to the second data center device based on the benefit value and the comparison of the budget to at least one of: the cost of analyzing the resolution process, and the cost of applying the resolution process to the second data center device.

11. The computer system according to claim 7, the publication and subscription component further configured to provide the error condition and the resolution process to the second enterprise group on a subscription basis.

12. The computer system according to claim 7, the publication and subscription component further configured to locate the second data center device based on at least one of: a profile associated with the second data center device, and a scan of a set of applications associated with the second data center device.

13. A computer-readable hardware storage device storing computer instructions, which when executed, enables a computer system to provide problem determination and resolution process cross communication, the computer instructions comprising:
  performing a sweep search of each data center device of a plurality of data center devices physically enclosed in a data center for at least one indicator of an error condition, the error condition comprising at least one of a software error, an inefficiency associated with non-optimal use of software and hardware, a presence of malware, an inappropriate security setting, or a back-level software;
  detecting symptoms of the error condition for a first data center device, the first data center device belonging to a first group of servers, the first data center device managed by a first enterprise group in a first management domain within a data center;
  performing a resolution process until a solution is found;
  analyzing the resolution process performed by the first enterprise group for addressing the error condition for the first data center device;
  recording all actions taken in the resolution process against the error condition;
  logging a design and configuration of the first data center device;
  removing from the resolution process any debugging and failed attempts;
  recording the any debugging and failed attempts as background for later use;
  determining, based on a type of error, a problem source, an environment setting, and design and configuration of a second data center device in a second management domain within the data center, whether the error condition and the resolution process should be published to at least one of the set of subscribers;
  publishing, based on the determination, the error condition and the resolution process for access by the at least one of the set of subscribers, the at least one of the set of subscribers comprising a second enterprise group that manages the second data center device in the second management domain within the data center, wherein the error condition relates to a set of common configurations shared by the first data center device and the second data center device; and
  determining whether to apply the resolution process to the second data center device by:
    determining a cost for determining and applying a fix for an error at the second data center device;
    determining an importance of applying the fix;
    determining a current and a forecast use of a financial budget for the second data center device; and
    comparing the cost for determining and applying the fix in relation to the importance of the fix to the financial budget to determine whether to apply the resolution process to the second data center device;
  wherein the first data center device comprises a first server in a client-server environment, and the second data center device comprises a second server in the client-server environment.

14. The computer-readable hardware storage device according to claim 13, further comprising computer instructions for applying the resolution process to the second data center device.

15. The computer-readable hardware storage device according to claim 13, further comprising computer instructions for determining whether to apply the resolution process to the second data center device based on a comparison of a budget to at least one of: a cost of analyzing the resolution process, and a cost of applying the resolution process to the second data center device.

16. The computer-readable hardware storage device according to claim 15, the computer instructions for determining whether to apply the resolution process to the second data center device further comprising:
 determining a benefit value of applying the resolution process to the second data center device; and
 determining whether to apply the resolution process to the second data center device based on the benefit value and the comparison of the budget to at least one of: the cost of analyzing the resolution process, and the cost of applying the resolution process to the second data center device.

17. The computer-readable hardware storage device according to claim 15, further comprising computer instructions for providing the error condition and the resolution process to the second enterprise group on a subscription basis.

18. The computer-readable storage hardware storage device according to claim 15, further comprising computer instructions for locating the second data center device based on at least one of: a profile associated with the second data center device, and a scan of a set of applications associated with the second data center device.

19. A method for deploying a solution publishing system for use in a computer system that provides problem determination and resolution process cross communication, the method comprising:
 providing a computer infrastructure operable to:
  perform a sweep search of each data center device of a plurality of data center devices physically enclosed in a data center for at least one indicator of an error condition, the error condition comprising at least one of a software error, an inefficiency associated with non-optimal use of software and hardware, a presence of malware, an inappropriate security setting, or a back-level software;
  detect symptoms of the error condition for a first data center device, the first data center device belonging to a first group of servers, the first data center device managed by a first enterprise group in a first management domain within a data center;
  perform a resolution process until a solution is found;
  analyze the resolution process performed by the first enterprise group for addressing the error condition for the first data center device;
  record all actions taken in the resolution process against the error condition;
 logging a design and configuration of the first data center device;
  remove from the resolution process any debugging and failed attempts;
  record the any debugging and failed attempts as background for later use;
  determine, based on a type of error, a problem source, an environment setting, and design and configuration of a second data center device in a second management domain within the data center, whether the error condition and the resolution process should be published to at least one of the set of subscribers;
  publish, based on the determination, the error condition and the resolution process for access by the at least one of the set of subscribers, the at least one of the set of subscribers comprising a second enterprise group that manages the second data center device in the second management domain within the data center, wherein the error condition relates to a set of common configurations shared by the first data center device and the second data center device; and
  determine whether to apply the resolution process to the second data center device by:
   determining a cost for determining and applying a fix for an error at the second data center device;
   determining an importance of applying the fix;
   determining a current and a forecast use of a financial budget for the second data center device; and
   comparing the cost for determining and applying the fix in relation to the importance of the fix to the financial budget to determine whether to apply the resolution process to the second data center device;
 wherein the first data center device comprises a first server in a client-server environment, and the second data center device comprises a second server in the client-server environment.

20. The method according to claim 19, further providing computer infrastructure operable to:
 provide the error condition and the resolution process to the second enterprise group on a subscription basis; and
 apply the resolution process to the second data center device.

* * * * *